United States Patent [19]

Baas

[11] Patent Number: 4,794,579
[45] Date of Patent: Dec. 27, 1988

[54] CIRCUIT FOR REMOTE-SCANNING AUDIO OR VIDEO DISK PLAYER FOR CONTACTLESS SCANNING WITH COARSE AND FINE DRIVE MECHANISMS FOR RADIAL SERVO READJUSTMENT

[75] Inventor: Dieter Baas, Kehl, Fed. Rep. of Germany

[73] Assignee: Deutsche Thomson-Brandt GmbH, VS-Villingen, Fed. Rep. of Germany

[21] Appl. No.: 939,429
[22] PCT Filed: Feb. 15, 1986
[86] PCT No.: PCT/EP86/00076
§ 371 Date: Nov. 4, 1986
§ 102(e) Date: Nov. 4, 1986
[87] PCT Pub. No.: WO86/05307
PCT Pub. Date: Sep. 12, 1986

[30] Foreign Application Priority Data
Mar. 9, 1985 [DE] Fed. Rep. of Germany ....... 3508421

[51] Int. Cl.⁴ .............................................. G11B 7/00
[52] U.S. Cl. .................................. 369/43; 360/77.02; 369/44
[58] Field of Search ................................... 369/43–47, 369/111; 358/342; 250/201–204; 360/77

[56] References Cited

U.S. PATENT DOCUMENTS

| | | | |
|---|---|---|---|
| 4,142,209 | 2/1979 | Hedlund et al. | 358/342 |
| 4,658,389 | 4/1987 | Kuehn | 369/112 X |
| 4,703,467 | 10/1987 | Elliott | 369/111 X |

Primary Examiner—Robert L. Richardson
Attorney, Agent, or Firm—Max Fogiel

[57] ABSTRACT

In order to obtain perfect scanning of audio and/or video disks through application of contactless scanning with a coarse and fine drive system for radial servo readjustment, the fine drive optimum working point is reached through a correct interaction of coarse and fine drive, even in the case of different large radial eccentricity amplitudes. This is achieved through adjustment of the coarse drive, using a comparator, as a threshold value detector, and through an evaluation of the pulse sequences occurring at the comparator output. A radial-error signal for the coarse drive is obtained from a control parameter for the fine drive. The coarse drive is started by pulses when the pulses obtained from a radial-error signal exceed a predetermined pulse-to-interval ratio.

5 Claims, 3 Drawing Sheets

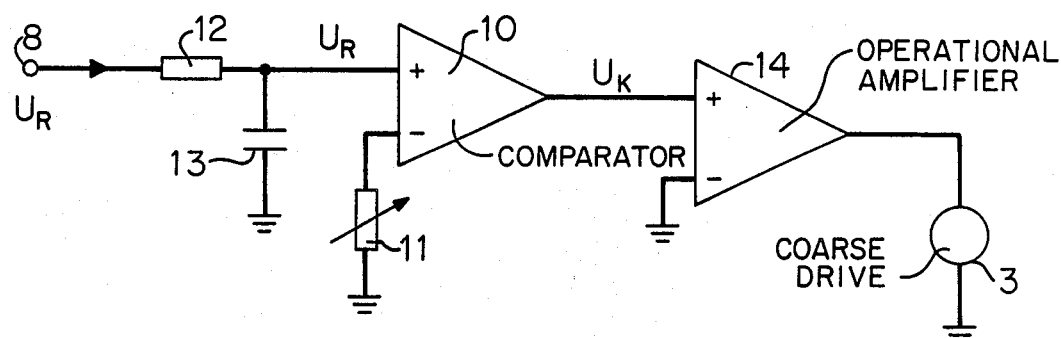
FIG. 3a
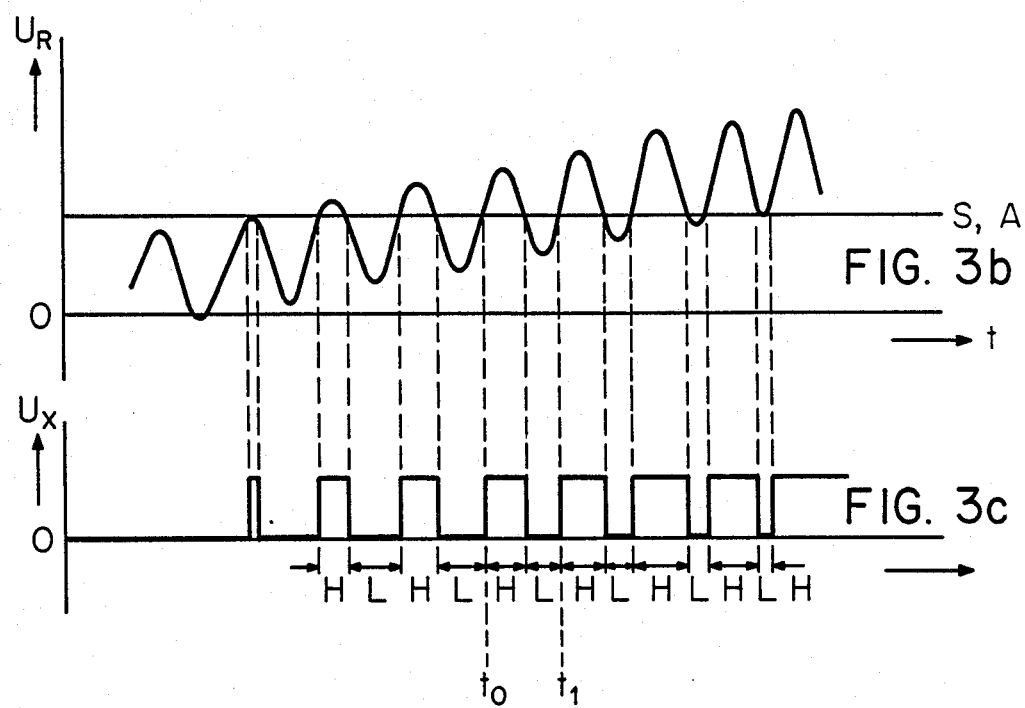
FIG. 3b
FIG. 3c
FIG. 3

CIRCUIT FOR REMOTE-SCANNING AUDIO OR VIDEO DISK PLAYER FOR CONTACTLESS SCANNING WITH COARSE AND FINE DRIVE MECHANISMS FOR RADIAL SERVO READJUSTMENT

The invention concerns circuitry for an audio or video disk player in accordance with the preamble to Claim 1.

Carrying out the requisite servo track readjustment by means of coarse-drive and precision-drive mechanisms, whereby the coarse-drive mechanism is always activated once and briefly once a prescribed threshold attained by integration of a radial error signal has been attained, is known for a track-guidance system for players for playing back audio and/or video disks. The function of the precision-drive mechanism is to rapidly control radial fluctuations in the track up to specific amplitudes.

Since the transducers in precision-drive mechanisms have characteristics that differ due to manufacturing tolerances, it is absolutely necessary in order to avoid errors in scanning to position the operating point of the particular precision-drive mechanism in the linear vicinity of the transmission curve. Known precision-drive mechanisms that integrate the radial error signal to activate the coarse-drive mechanism, however, involve the drawback that the operating point can migrate when the audio or video disk has different radial eccentricities.

The object of the invention is to provide a circuit wherein the optimum operating point of the radial precision-drive mechanism will be maintained while taking the various amplitudes of the radial eccentricity into consideration.

This object is attained by the invention recited in claim 1. Practical embodiments and developments of the invention are recited in the subsidiary claims.

The invention will now be specified with reference to the drawings, wherein

FIG. 3a illustrates a threshold device in the form of a comparator,

FIG. 3b shows a radial-error signal without guidance for the coarse-drive system, FIG. 3c shows the corresponding sequence of pulses at the computer output terminal.

Figure 1:
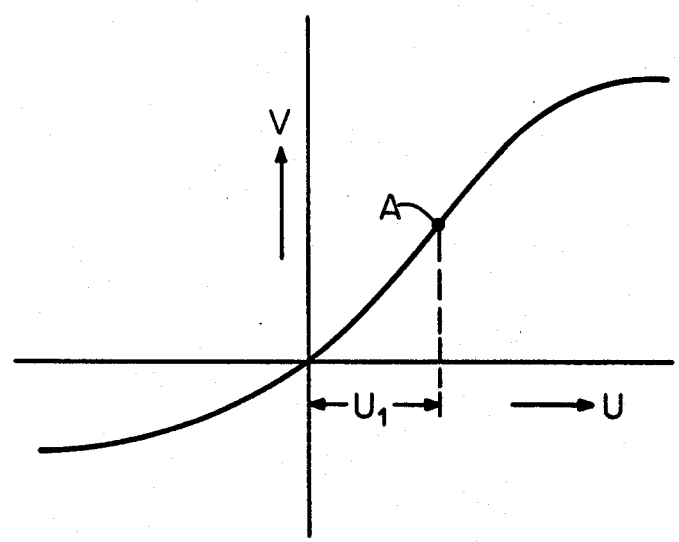
FIG. 1 shows the transmission curves of a known precision-drive mechanism.

FIG. 1 shows by way of example of a typical precision-drive mechanism the curve $v = f(u)$, whereby v is the amplitude of motion and u is the voltage at the precision-drive mechanism. Due to the non-linearity of curve $v = f(u)$, operating point A must not be selected at $U=0$ in this precision-drive mechanism. Unobjectionable scanning cannot occur until $U=U_1$.

Figure 2:
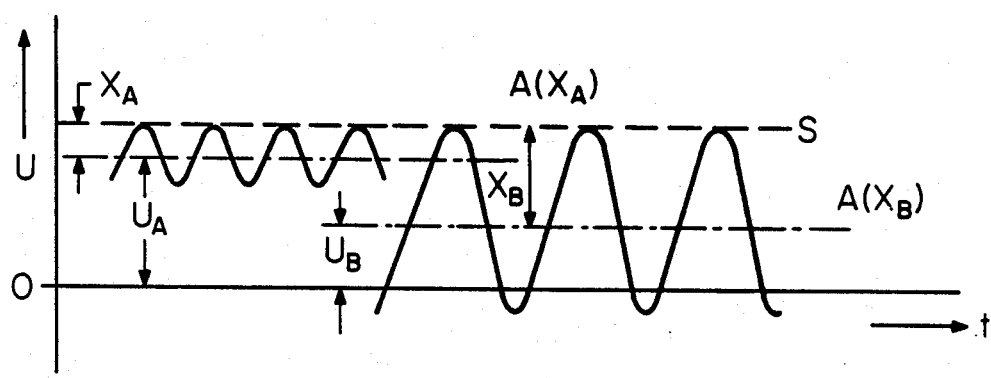
FIG. 2 shows the effects of radial eccentricity on the operating point.

FIG. 2 shows the effect of a displacement of the operating point. In precision-drive systems with a threshold-detector circuit and a threshold S as specified in the applicants' own Application No. P 35 08 422.7 (T-PA 522) different radial-eccentricity amplitudes have the drawback of displacing operating point A. With small radial eccentricities $X_A$ operating point $A(X_A)$ is displaced only slightly, whereas the displacement is extensive with large radial eccentricities $X_b$.

FIG. 3a illustrates the system for activating a coarse-drive mechanism 3 with a comparator 10 as threshold detector known from No. P 35 08 422.7 (T-PA 522). A radial-error signal $U_R$ is supplied by input terminal 8 through an RC stage 12 and 13 to the non-inverting input terminal of a comparator 10. The inverting input terminal of comparator 10 is connected to reference-voltage level by an adjustable resistor 11 that controls the threshold of comparator 10. When the threshold of comparator 10 is exceeded, the output signal $U_K$ from comparator 10 starts coarse-drive mechanism 3 up through an operational amplifier 14, and the mechanism immediately starts moving due to the complete operational voltage derived from amplifier 14. The coarse-drive mechanism continues rotating until radial-error signal $U_R$ drops below the threshold of comparator 10.

FIG. 3b illustrates radial-error signal $U_R$ at the input terminal of comparator 10 for a situation in which coarse-drive mechanism 3 is to be prevented from moving. A track advance delivered by precision-drive mechanism 2 occasions a slow increase in radial-error signal 8.

FIG. 3c shows the sequence $U_K$ of pulses at the output terminal of comparator 10. Pulse sequence $U_K$ functions, due to a comparison of the widths of the subsequent pulses, as a criterion for the correct operating point A. Coarse-drive mechanism 3 can be readjusted when the ratio of pulse widths is greater than 1 for example. A precise adjustment of operating point A is attained with respect to precision-drive mechanism 2 when the ratio of pulse widths is 1.

Figure 4:
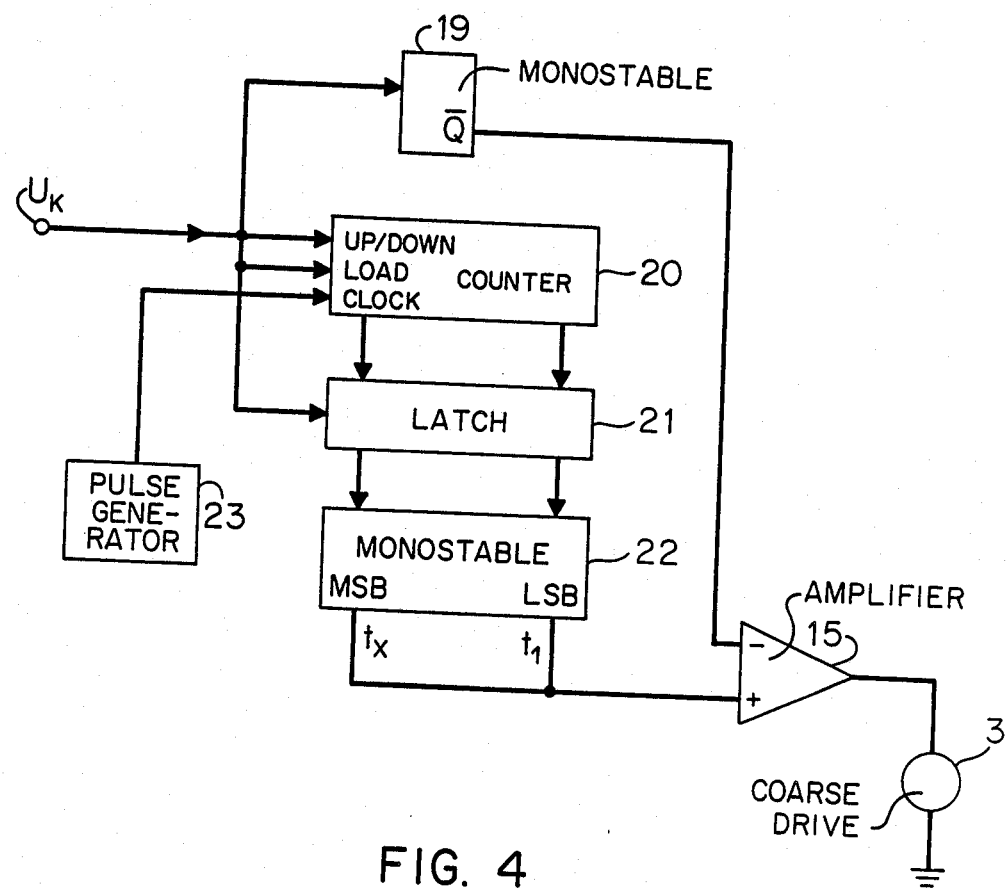
FIG. 4 illustrates the control circuitry for a coarse-drive system by way of example.

FIG. 4 illustrates an embodiment that will precisely maintain a precision-drive operating point A. A two-way counter 20 detects the various threshold-pulse widths $U_K$, and pulses for coarse-drive mechanism 3 are obtained through variously adjusted monostable flip-flops 22. Pulse sequence $U_K$ is supplied to the counting-direction input terminal of a counter 20. It is simultaneously supplied to the charging input terminals of counter 20, of a monostable flip-flop 19, and of a latch 21, which are set when a positive edge emerges in pulse sequence $U_K$. Clocking pulses are supplied to counter 20 from a pulse generator 23, and are added during one pulse in pulse sequence $U_K$ and subtracted during the interval. If the pulse lasts less than the interval, the counting state of counter 20 is zero. As soon as the duration of the pulse exceeds that of the interval, when, that is, the pulse-to-interval ratio is greater than 1, a result will be available at the output terminals of counter 20. When a positive edge occurs within pulse sequence $U_K$, the counting result of counter 20 will be taken over by latch 21 and supplied to monostable flip-flop 22. A pulse of a specific duration that corresponds to the counting result from counter 20 will then occur at the output terminals of monostable flip-flop 20 and will open operational amplifier 15 for that period of time and activate coarse-drive mechanism 3. A current will then flow through coarse-drive mechanism 3 in the positive direction only when the counting result is greater than zero.

If there are major negative deviations from the threshold in radial-error signal $U_R$, the intervals between the pulses will be long (cf. FIG. 3c). Monostable flip-flop 19 will no longer be triggered in that case. Since the inverting output terminal Q of monostable flip-flop 19 is connected to the inverting input terminal of operational amplifier 15, coarse-drive mechanism 3 will be shifted into the opposite direction, and the precision-drive mechanism will be rapidly shifted to optimum operating point A. The time constant of monostable flip-flop 19 will simulataneously be equal to or greater than the maximum actual pulse-period duration.

What is claimed is:

1. Circuit arrangement for a remote-scanning audio or video disk player, comprising: scanning means; coarse-drive means and precision-drive means for radial servo readjustment of said scanning means; said precision-drive means having a control parameter, a radial-error signal for said coarse-drive means being obtained from said control parameter; means for starting said coarse-drive means by pulses when pulses obtained from a radial-error signal exceed a predetermined pulse-to-interval ratio.

2. A circuit arrangement as defined in claim 1, including a two-way counter for determining the mean radial-error signal.

3. A circuit arrangement as defined in claim 2, wherein said two-way counter is inhibited from supplying results until the radial-error signal exceeds the mean.

4. A circuit arrangement as defined in claim 2, wherein said coarse-drive means operates in a direction opposite to the playback direction when the radial-error signal is substantially below the mean.

5. A circuit arrangement as defined in claim 2, wherein said coarse-drive means is prevented from starting until said pulse-to-interval ratio exceeds 1.

* * * * *